(12) United States Patent
Stroh et al.

(10) Patent No.: US 6,644,291 B2
(45) Date of Patent: Nov. 11, 2003

(54) CONTROL METHOD AND APPARATUS FOR ADAPTIVELY DETERMINING A FUEL PULSE WIDTH

(75) Inventors: David James Stroh, Farmington Hills, MI (US); James Michael Kerns, Trenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 47 days.

(21) Appl. No.: 10/063,047

(22) Filed: Mar. 14, 2002

(65) Prior Publication Data

US 2003/0172914 A1 Sep. 18, 2003

(51) Int. Cl.[7] ............................................... F02D 41/14
(52) U.S. Cl. ........................................ 123/674; 123/698
(58) Field of Search .................................. 123/674, 698

(56) References Cited

U.S. PATENT DOCUMENTS

| | | | |
|---|---|---|---|
| 4,641,623 A | 2/1987 | Hamburg | |
| 5,048,493 A | 9/1991 | Orzel et al. | |
| 5,448,978 A | 9/1995 | Hasegawa et al. | |
| 5,606,959 A | 3/1997 | Maki et al. | |
| 6,173,703 B1 * | 1/2001 | Matsumoto | 123/674 |
| 6,230,699 B1 * | 5/2001 | Mitsutani | 123/674 |
| 6,234,156 B1 * | 5/2001 | Muto | 123/698 |
| 6,318,349 B1 * | 11/2001 | Muto et al. | 123/674 |
| 6,321,735 B2 * | 11/2001 | Grieve et al. | 123/674 |
| 6,397,829 B1 * | 6/2002 | Toyoda | 123/674 |
| 6,442,455 B1 * | 8/2002 | Kotre et al. | 123/698 |

* cited by examiner

*Primary Examiner*—Erick Solis
(74) *Attorney, Agent, or Firm*—John F. Buckert; Allan J. Lippa

(57) ABSTRACT

A control system for controlling an engine (10) of an automotive vehicle has an air charge sensor (47) generating a first signal indicative of an air charge, a purge flow valve (74) generating a second signal indicative of purge flow. A controller (42) is coupled to the air charge sensor and the purge flow valve. The controller (42) is configured to determine a first amount of fuel to deliver to the cylinder based on the first signal and a desired air-fuel ratio. The controller is configured to calculate a first air-fuel ratio change value based on the first signal and is configured to calculate a second air-fuel ratio change value based on the second signal. The controller is configured to deliver a second amount of fuel to the cylinder based on the first amount of fuel and the first and second air-fuel ratio change values.

21 Claims, 8 Drawing Sheets

CONTROL METHOD AND APPARATUS FOR ADAPTIVELY DETERMINING A FUEL PULSE WIDTH

BACKGROUND OF INVENTION

The present invention relates generally to a control system for controlling the air fuel ratio of an internal combustion of an automotive vehicle, and more particularly, to a method and apparatus for controlling a fuel pulse width in response to changes in a normalized air charge and in a normalized purge vapor flow from an engine fueling system.

Minimizing tailpipe emission is an objective of closed loop fuel systems. Closed loop fuel systems include a catalytic converter that is used to treat the exhaust gas of an engine. The efficiency of a catalytic converter is affected by the ratio of air to fuel supplied to the engine. At the stoichiometric ratio, catalytic conversion efficiency is high for both oxidation and reduction conversions. The air/fuel stoichiometric ratio is defined as the ratio of air to fuel which in perfect combustion would yield complete consumption of the fuel. The air/fuel ratio Lambda of an air/fuel mixture is the ratio of the amount by weight of air divided by the amount by weight of fuel to the air/fuel stoichiometric ratio. Closed loop fuel control systems are known for use in keeping the air/fuel ratio in a narrow range about the stoichiometric ratio, known as a conversion window.

The difficulty with known systems is that the catalyst is very sensitive to errors in the input air fuel mixture. Fueling errors may result in catalyst breakthrough and therefore a reduction in the efficiency of the catalyst.

Known engine air-fuel control systems generally execute control steps using several stored conversion/determination tables to control delivery of an air-fuel mixture to an engine cylinder. For example, known systems generally perform the following steps: (i)measure a signal generated by an mass air-flow sensor; (ii)determine a measured air flow value using an air flow table indexed by a voltage of the mass air flow sensor signal; (iii)determine an air charge per cylinder using an air charge table indexed by the measured air flow and the speed (RPM) of the engine; (iv)determine a fuel charge based on fuel table indexed by air charge per cylinder; (v)calculate a fuel injector pulse width based on the fuel charge.

As discussed, the known engine control systems utilize the air flow table, the air charge table, and the fuel table for engine air-fuel control. The development of these tables during engine calibration at a vehicle design center involves considerable time and effort. Further, the numerous tables require a relatively large amount of memory in the engine controllers which leads to increased engine cost.

SUMMARY OF INVENTION

The present invention provides a method and apparatus for controlling the operation of an engine of the automotive vehicle by determining an overall fuel pulse width that is a function of air charge load and the purge function.

In one aspect of the invention, a method for controlling an amount of fuel delivered to a cylinder of an internal combustion engine includes determining a first amount of fuel to deliver to said cylinder based on a current air charge of said cylinder and a desired air-fuel ratio, calculating a first air-fuel ratio change value based on an amount of change in the air charge, calculating a second air-fuel ratio change value based on an amount of change in purge flow to the cylinder, and delivering a second amount of fuel to the cylinder based on the first amount of fuel, and the first and second air-fuel ratio change values.

In a further aspect of the invention, a control system for controlling an engine of an automotive vehicle has an air charge sensor generating a first signal indicative of an air charge, a purge flow valve generating a second signal indicative of purge flow. A controller is coupled to the air charge sensor and the purge flow valve. The controller is configured to determine a first amount of fuel to deliver to the cylinder based on the first signal and a desired air-fuel ratio. The controller is configured to calculate a first air-fuel ratio change value based on the first signal and is configured to calculate a second air-fuel ratio change value based on the second signal. The controller is configured to deliver a second amount of fuel to the cylinder based on the first amount of fuel and the first and second air-fuel ratio change values.

The inventors herein have recognized that engine air-fuel control systems can be greatly simplified by (i) determining an initial fueling amount upon engine startup and (ii) adjusting the fueling amount based on "changes" in engine load and vapor purge. By simply adjusting the fuel amount based on subsequent changes in engine load and vapor purge, the inventive control strategy eliminates the air charge table and the fuel table, required by known systems. Thus, the inventive control system results in considerable timing savings during vehicle calibration (since the air charge table and the fuel table need not be developed) for a given engine. Further, by eliminating the two tables, the memory size of the engine controller can be reduced resulting in engine cost savings. Further, one skilled in the art will recognize that the method is much simpler to implement than known methods.

Other advantages and features of the present invention will become apparent when viewed in light of the detailed description of the preferred embodiment when taken in conjunction with the attached drawings and appended claims.

DETAILED DESCRIPTION

Figure 1:
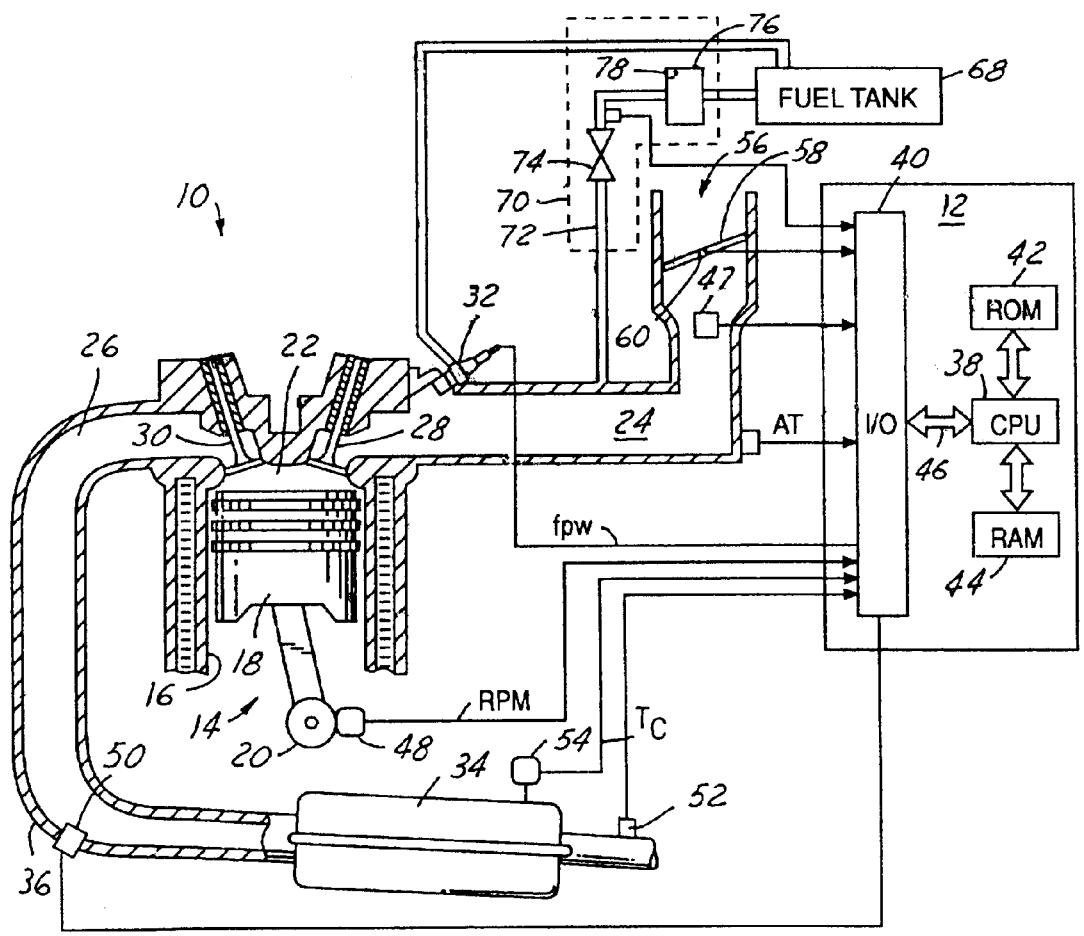
FIG. 1 is a block diagrammatic view of an engine having a control system according to the present invention.

In the following example the same reference numerals and signal names will be used to identify the respective same components and the same electrical signals in the various views.

Referring now to FIG. 1, internal combustion engine 10 is controlled by electronic controller 12. Engine 10 has a plurality of cylinders 14, one of which is shown. Each cylinder has a cylinder wall 16 and a piston 18 positioned therein and connected to a crankshaft 20. A combustion chamber 22 is defined between piston 18 and cylinder wall 16. Combustion chamber 22 communicates between intake manifold 24 and exhaust manifold 26 via a respective intake valve 28 and an exhaust valve 30. Intake manifold 24 is also shown having fuel injector 32 coupled thereto for delivering liquid fuel in proportion to the pulse width of signal (FPW) from controller 12. The fuel quantity together with the amount of air mass in the intake manifold 24 defines the air/fuel ratio directed into combustion chamber 22. Those skilled in the art will also recognize that engine may be configured such that the fuel is injected directly into the cylinder of the engine in a direct injection type system.

A catalyst 34 is coupled to exhaust manifold 26 through exhaust system 36. Catalyst 34 is used to reduce tail pipe emissions by performing reduction and oxidation reactions with the combustion gasses leaving cylinder 22 through exhaust valve 30.

Controller 12 is shown as a conventional microcomputer including a microprocessing unit (CPU) 38, input/output ports 40, read-only memory 42, random access memory 44, and a conventional data bus 46 therebetween.

Controller 12 is shown receiving various signals from sensors coupled to engine 10. The various sensors may include a mass airflow sensor 47 used to provide an air mass signal to controller 12. A manifold absolute pressure (MAP) sensor that generates manifold absolute pressure may be used in place of mass airflow sensor. An engine speed sensor 48 is used to generate an engine speed signal corresponding to the rotational speed of the crankshaft. An exhaust gas oxygen sensor 50 positioned upstream of catalyst 34 provides a signal corresponding to the amount of oxygen in the exhaust gas prior to the catalyst. One suitable example of an exhaust gas oxygen sensor is a UEGO sensor. A second exhaust gas oxygen sensor 52 may be coupled to the exhaust system after catalyst 34. One suitable example of an UEGO sensor downstream of catalyst 34 is a heated exhaust gas oxygen sensor. Catalyst 34 may also have a temperature sensor 54 coupled thereto. Catalyst temperature sensor 54 provides an operating temperature signal for the catalyst to controller 12. Although a physical sensor 54 is illustrated, sensor 54 may also indirectly determine a temperature of the catalyst from other sensed inputs. The temperature of the catalyst may be estimated based upon the various engine operating conditions. In particular, catalyst temperature may be estimated using on a normal estimated temperature based on engine operating conditions that represent the catalyst temperature under normal conditions increased by a change in temperature based on the various operating conditions such as engine speed or load.

A throttle body 56 having a throttle plate 58 and a throttle position sensor 60 is illustrated. Throttle position sensor 60 provides controller 12 with an electrical signal corresponding to the desired driver demand.

A fuel system 66 is coupled to engine 10 through fuel injector 32. Fuel injector 32 receives fuel from fuel tank in a conventional manner such as through the use of a fuel pump (not shown). A fuel vapor recovery system 70 is shown coupled between fuel tank 68 and intake manifold 24 via a purge line 72 and a purge control valve 74. A canister 76 is coupled to purge line 72. Canister 72 absorbs fuel vapors from the fuel tank 68 and stores them in activated charcoal contained within canister 76. Purge control valve 74 is controlled by controller 12. Of course, those skilled in the art will recognize that a separate controller may be used to control the valve 74. Valve 74 may, for example, comprise a pulse width actuated solenoid valve having a substantially cross-sectional area. Of course, a valve having a variable orifice may also be used.

During a fuel vapor purge, air is drawn through canister 76 through an inlet vent 78 absorbing hydrocarbons from the activated charcoal. The mixture of purged air and absorbed vapors is then inducted into intake manifold 24 via purge control valve 74. A purge flow sensor 80 provides feedback to controller 12 as to the volume or flow rate of the purge.

Figure 2A:
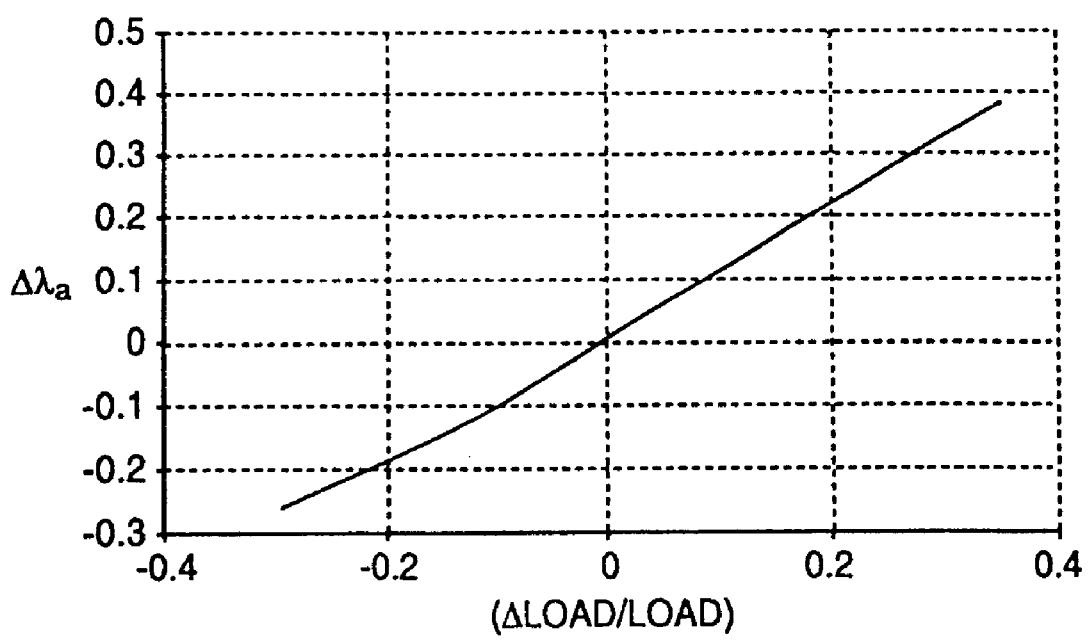
FIG. 2A is a plot of a Δ load/load versus $\lambda_a$.

Referring now to FIG. 2A, a plot of normalized load change versus the lambda excursion due to the air path dynamics is illustrated. The plot is referred to as the air model.

Figure 2B:
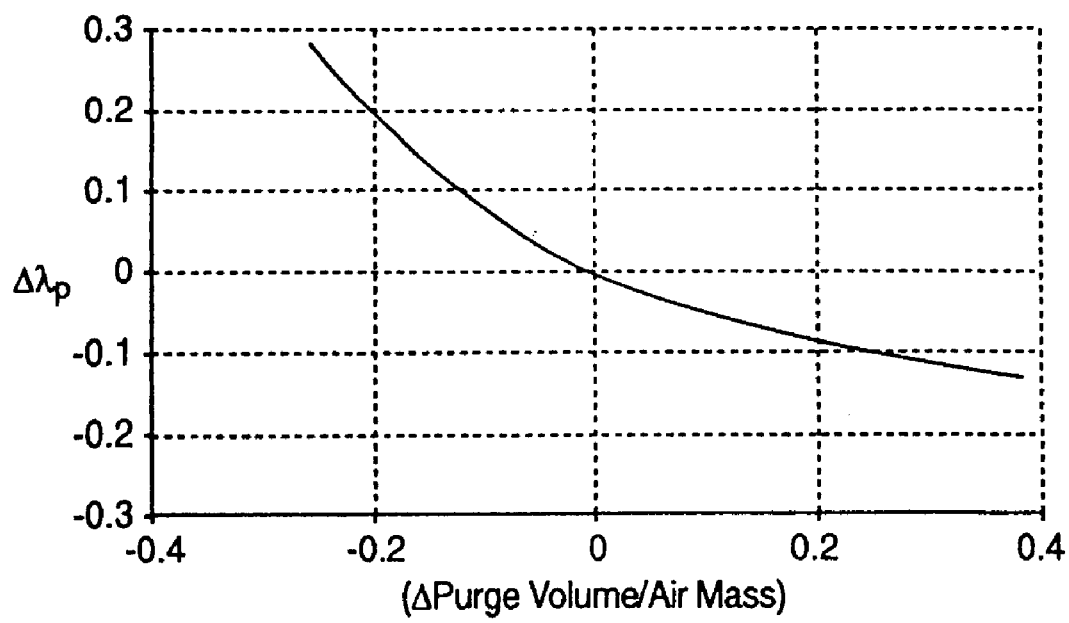
FIG. 2B is a plot of fuel multiplier versus a ($\lambda_p$).

Referring now to FIG. 2B, the change in purge flow/air mass is illustrated with respect to the air/fuel ratio excursion ($\Delta\lambda_p$). This plot is referred to as the purge model.

Figure 2C:
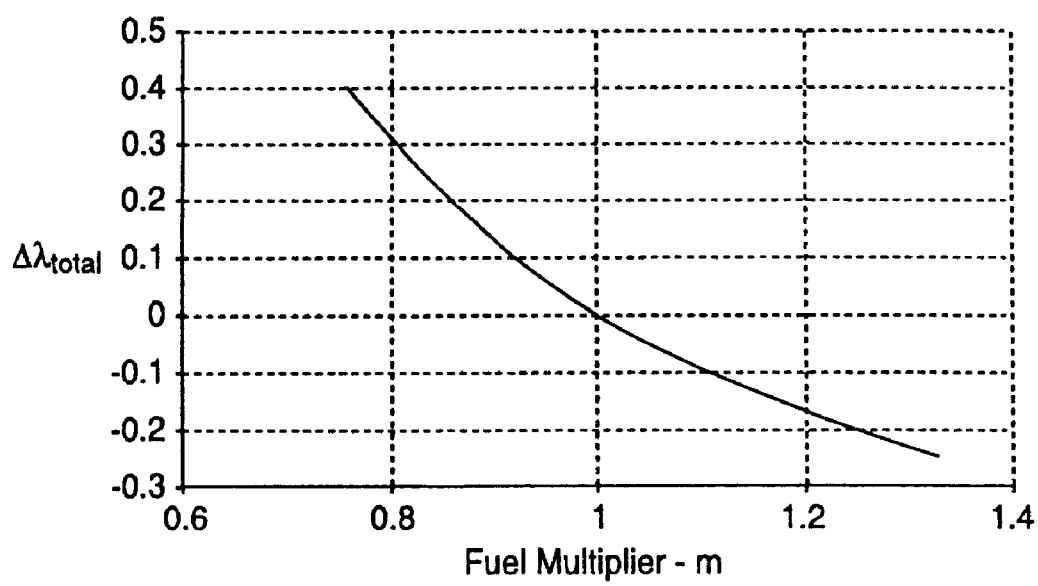
FIG. 2C is a plot of purge volume/air mass versus ($\lambda_p$).

Referring now to FIG. 2C, the fuel multiplier (m) is plotted versus the air/fuel ratio lambda excursion ($\Delta\lambda_{total}$). The total takes into consideration purge model and the air model in the preceding figures.

Each of the plots shown in FIGS. 2A, 2B, and 2C may be experimentally determined for each engine type. Those skilled in the art will recognize that the experimental results used to determine the plots illustrated may be derived from on road and laboratory environments.

Figure 3:
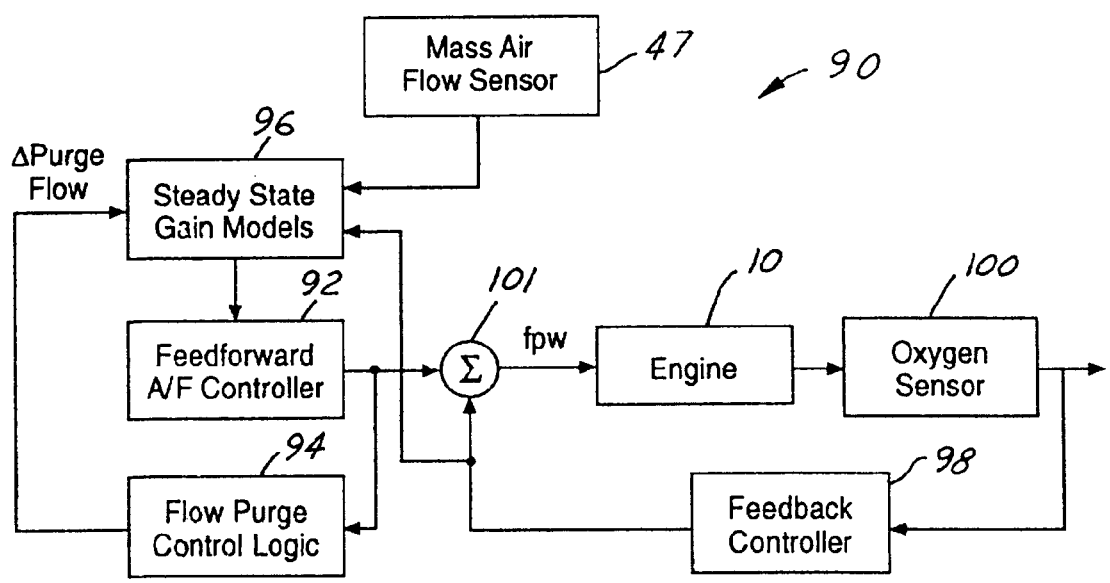
FIG. 3 is a block diagrammatic view of a control system according to the present invention.

Referring now to FIG. 3, a block diagrammatic view of control system 90 according to the present invention is illustrated. Control system 90 includes a feed forward air/fuel controller 92, a flow purge control logic 94, and steady state gain models 96. Steady state gain models 96 are coupled to feed forward controller 92. Feed forward controller 92 is coupled to flow purge control logic 94. Purge control logic 94 is coupled to steady state gain models 96. Feed forward controller 92 determines a fuel pulse width (FPW) that is compared to feedback from a feedback controller 98. The fuel pulse width is coupled to engine 10 for which the fuel pulse width in combination with the air charge as measured by mass air flow sensor 47. Oxygen sensor 100 monitors the amount of oxygen in the exhaust gas which in turn may be used to determine the catalyst efficiency. Oxygen sensor 100 may be one of the oxygen sensors such as a UEGO sensor 50 or the HEGO sensor 52 shown in FIG. 1. Of course, a combination of the two sensors may also be used. By monitoring the amount of oxygen in the exhaust gas, feedback controller 98 can determine how well the feed forward controller predicted the required change in the fuel pulse width. The feedback error signal is zero when the feed forward controller precisely predicted the lambda excursion. When the feedback from feedback controller 98 is large, adaptation, as will be further described below, may be performed.

Figure 4:
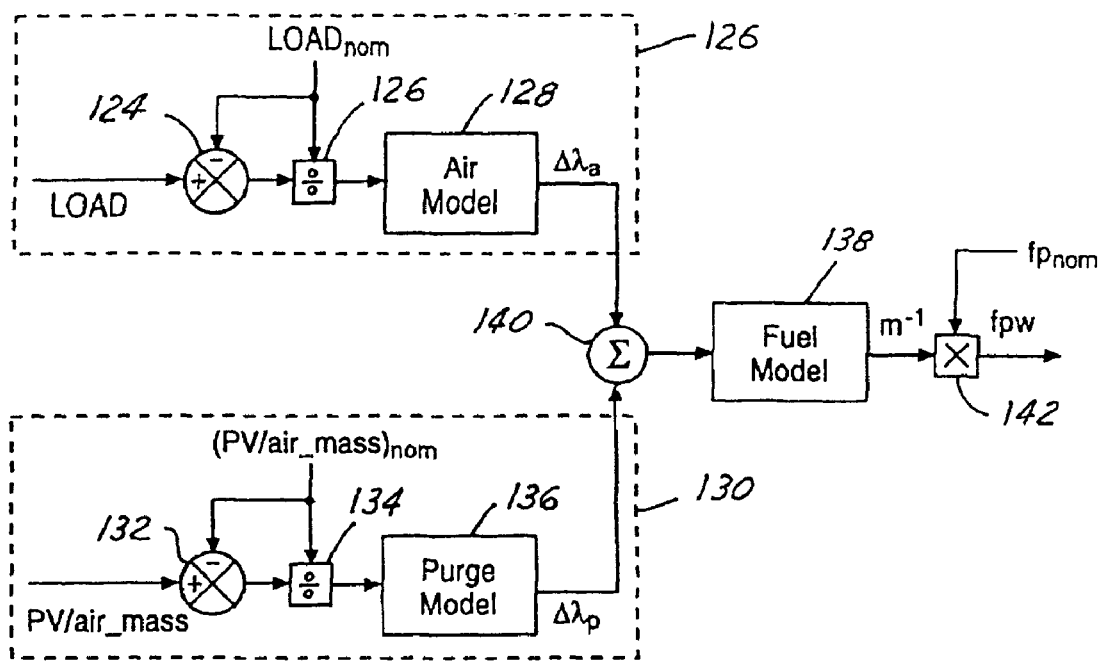
FIG. 4 is a block diagrammatic view of adaptation monitor logic according to the present invention.
Figure 5:
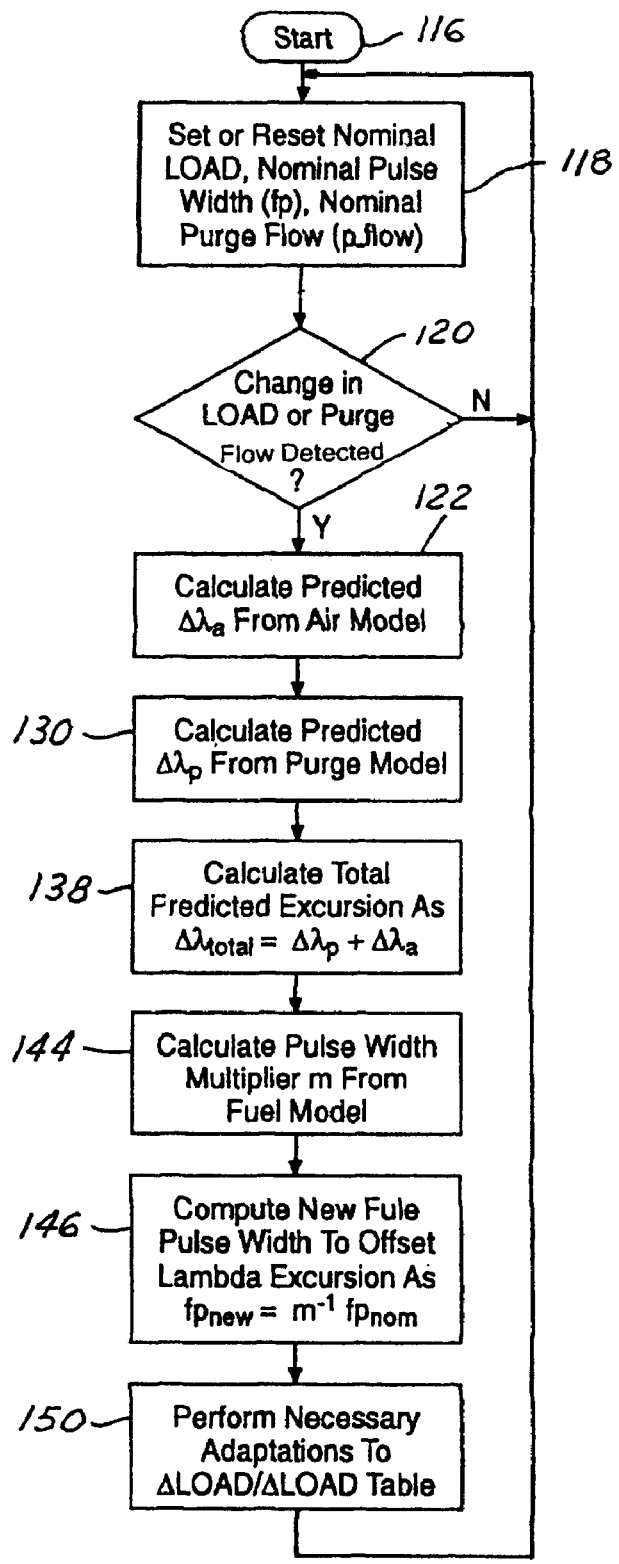
FIG. 5 is a flow chart of adaptation monitor logic according to the present invention.

Referring now to FIGS. 4 and 5, the operation of the feed forward controller is illustrated in FIG. 4, and the fueling control process is described in the flow chart in FIG. 5. The system starts at block 116. In step 118, because the models operate in normalized domains, it is necessary to store the current load (LOAD), normalized purge flow (PV_flow), and fuel pulse width (fp). The fueling control process is initialized during cranking. At a designated time during the cranking process, the instantaneous cranking fuel pulse width (as determined by the cranking algorithm) and the instantaneous load and purge volume measurements are stored, thus initializing the controller variables of current load and current fuel pulse width. The system monitors a change in load and a change purge flow in step 120. In step 122, a change in load is determined by the addition block 124 and division block 126 of FIG. 4. The input to addition block 124 determines the change in load (Δ LOAD) by subtracting (LOAD$_{nom}$–LOAD) and dividing the result by LOAD$_{nom}$ in block 126. When a change in air charge (load) is determined in step 120 as indicated by the mass-air-flow sensor corresponding to the driver throttle command, an appropriate fuel pulse width multiplier is calculated in step 122 by air model 128 to offset the predicted lambda excursion (Δλ$_a^-$) as a result in the relative change in air mass to the cylinder (i.e. Δλ$_a$=f(Δ LOAD/LOAD$_{nom}$)).

In step 130, when a change in purge flow is indicated (by a change in the duty cycle of the vapor management valve) a multiplier is calculated to offset the predicted lambda excursion (Δλ$_p$) resulting from a change in purge flow into the intake manifold (i.e. Δλ$_p$=f(Δ PV/air_mass)). A change in purge volume is determined in the model by addition block 132 and division block 134. The PV/air_mass$_{nom}$ is subtracted from the instantaneous purge volume PV/air_mass and is divided by the purge flow, PV/air_mass. The change is determined by purge model 136. A total predicted lambda excursion (Δλ$_a$+Δλ$_p$=Δλ$_{total}$) is determined in step 138 by summing block 140 of FIG. 4. This total with the lambda excursion in step 138 from fuel model 142 (Δλ$_f$=Δλ$_{total}$) is solved using the fuel model (Δλ$_f$=f(m)) for m in step 144. This multiplier (m) is inverted and applied to the current fuel pulse width (fp$_{nom}$) to determine a new fuel pulse width (fp$_{new}$) for engine 10 in step 146. This is performed in FIG. 4 by multiplier block 148. The feedback loop with feedback controller 98 of FIG. 3 generates a fuel pulse width correction that corrects for any errors in the feed forward control. This delta fuel pulse width is added to the feed forward pulse width at summing junction 101 of FIG. 3.

In step 150, once steady state has been reached, adaptation logic is used to change the models, i.e., the LOAD/Δ LOAD table, to restore the performance of the feed forward controller. The process then repeats in step 118.

Advantageously, the logic set forth above allows both models to be adapted routinely without biased treatment of either the air or purge model. This is particularly important for the purge model which needs continual adaptation to respond to changes in the fuel vapor content in the purge flow.

Figure 6:
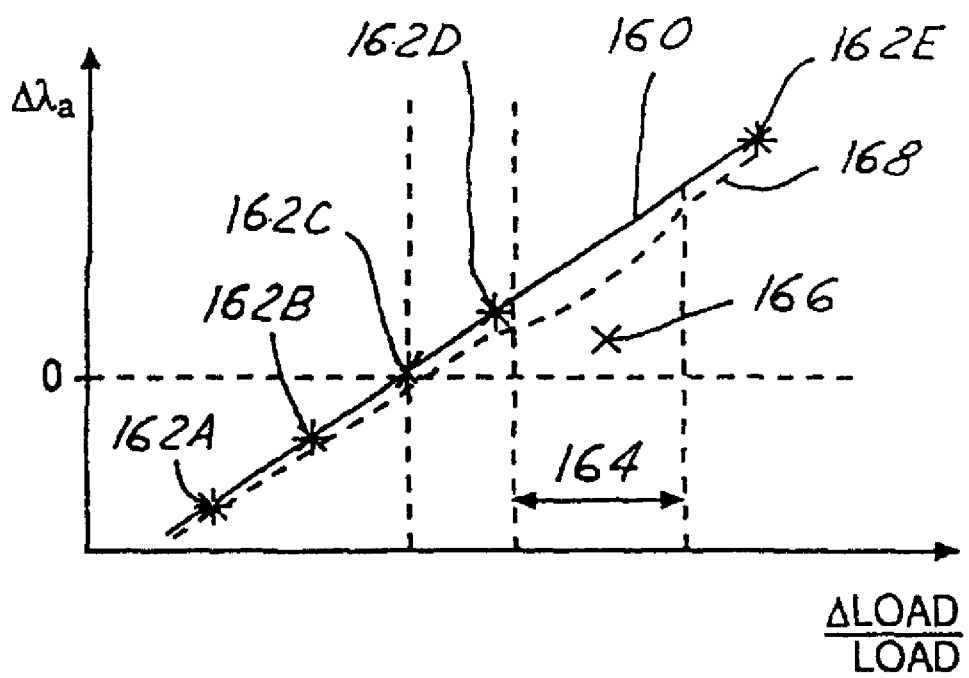
FIG. 6 is a plot illustrating a recursive method for adjusting the models show in FIG. 2A.

Referring now to FIG. 6, adaptation of the air/fuel model is performed using a recursive least squares algorithm (RLS). As can be seen, the original model line 160 (such as the Δ load/load versus Δλ$_a$ of FIG. 2A) is illustrated along with various data points 162A, 162B, 162C, 162D, and 162E. During an adaptation window 164, a point of error 166 is determined. By factoring in the previous points 162A–162E, the point in error using the recursive least squares method can determine a revised model illustrated by dash line 168. Thus, each model can be updated during the operation of the vehicle which compensates for various conditions such as wear and catalyst life. Of course, those skilled in the art will recognize the other plots shown in FIGS. 2B and 2C may be modified in a similar manner.

While particular embodiments of the invention have been shown and described, numerous variations and alternate embodiments will occur to those skilled in the art. Accordingly, it is intended that the invention be limited only in terms of the appended claims.

What is claimed is:

1. A control system for controlling an amount of fuel delivered to a cylinder of an internal combustion engine, said engine having an intake manifold communicating with a purge vapor system and said cylinder, said control system comprising:

a first sensor generating a first signal indicative of a current air charge delivered to said cylinder;

a second sensor generating a second signal indicative of a purge vapor flow; and a controller operably connected to said first and second sensors, said controller configured to determine a first amount of fuel to deliver to said cylinder based on said first signal and a desired air-fuel ratio, said controller configured to calculate a first air-fuel ratio change value based on said first signal, said controller configured to calculate a second air-fuel ratio change value based on said second signal, said controller configured to deliver a second amount of fuel to said cylinder based on said first amount of fuel and said first and second air-fuel ratio change values.

2. A control system as recited in claim 1 further comprising an exhaust gas oxygen sensor, wherein said controller is programmed to calculate an error signal in response to said error signal and controller configured to deliver a second amount of fuel to said cylinder based on said first amount of fuel, said first and second air-fuel ratio change values and the error signal.

3. A control system as recited in claim 2 wherein said controller is configured to determine the first air-fuel ratio change value signal as a function of an air charge model; and said controller configured to determine a second air fuel ratio change as a function of a purge flow model.

4. A control system as recited in claim 3 wherein said controller is programmed to change the air charge model in response to said error signal.

5. A control system as recited in claim 3 wherein said controller is programmed to change the purge flow model in response to said error signal.

6. A method for controlling an amount of fuel delivered to a cylinder of an internal combustion engine, said method comprising:

determining a first amount of fuel to deliver to said cylinder based on a current air charge of said cylinder and a desired air-fuel ratio;

calculating a first air-fuel ratio change value based on an amount of change in said air charge;

calculating a second air-fuel ratio change value based on an amount of change in purge flow to said cylinder; and, delivering a second amount of fuel to said cylinder based on said first amount of fuel, and said first and second air-fuel ratio change values.

7. A method as recited in claim 6 further comprising monitoring the operation of the engine after delivering a second amount of fuel to said cylinder.

8. A method as recited in claim 7 wherein monitoring comprises measuring exhaust gas oxygen to determine an error signal; when the error signal exceeds a predetermined limit, adjusting said second amount of fuel.

9. A method as recited in claim 6 wherein calculating a first air-fuel ratio change comprises calculating the first air-fuel ratio change from a normalized change in air charge.

10. A method as recited in claim 9 wherein calculating the first air-fuel ratio change from a normalized change in air charge comprises calculating the first air fuel ratio change from the normalized change in air charge and an air charge model.

11. A method as recited in claim 10 further comprising adapting an air charge model when a feedback signal is out of tolerance.

12. A method as recited in claim 6 wherein calculating a second air fuel ratio change comprises calculating the second air fuel ratio change as a function of a purge flow change normalized with an air mass flow rate.

13. A method as recited in claim 12 wherein calculating the second air fuel ratio change as a function of a purge flow change normalized with an air mass flow rate comprises calculating the second air fuel ratio excursion as a function of a purge flow change normalized with an air mass flow rate and a purge model.

14. A method as recited in claim 13 further comprising when no change in air charge is observed, perturbing a purge valve, and adapting a purge model when a feedback signal is out of tolerance.

15. A method as recited in claim 14 wherein the step of adapting is performed using a recursive least squares method.

16. A control system for controlling the operation of an engine having an exhaust gas sensor and air charge sensor, said system comprising:

a feed-forward controller determining an overall fuel pulse width as a function of an air charge change, and a purge flow change;

a feedback controller coupled to the exhaust gas oxygen signal, for determining pulse width correction in response to the oxygen signal; and a summing block coupled to the feed forward controller and the feedback controller, said summing block generating an adjusted fuel pulse width as a function of said overall fuel pulse width and said pulse width correction.

17. A control system as recited in claim 16 wherein said feed-forward controller determines the overall fuel pulse width as a function an air charge model.

18. A control system as recited in claim 16 wherein said feed-forward controller adjusts said air charge model in response to said pulse width correction.

19. A control system as recited in claim 16 wherein said feed-forward controller determines the overall fuel pulse width as a function of a purge model.

20. A control system as recited in claim 19 wherein said feed-forward controller adjusts said purge model in response to said pulse width correction.

21. An article of manufacture comprising a computer storage medium having a computer program encoded therein for controlling an engine of an automotive vehicle, said computer storage medium comprising:

code for determining a first amount of fuel to deliver to said cylinder based on a current air charge of said cylinder and a desired air-fuel ratio;

code for calculating a first air-fuel ratio change value based on an amount of change in said air charge;

code for calculating a second air-fuel ratio change value based on an amount of change in purge flow to said cylinder; and, code for delivering a second amount of fuel to said cylinder based on said first amount of fuel, and said first and second air-fuel ratio change values.

* * * * *